(12) United States Patent
O'Keeffe

(10) Patent No.: US 7,090,906 B2
(45) Date of Patent: Aug. 15, 2006

(54) FIRE RESISTANT SAFETY GLASS

(75) Inventor: William O'Keeffe, San Francisco, CA (US)

(73) Assignee: O'Keeffe's, Inc., San Francisco, CA (US)

( * ) Notice: Subject to any disclaimer, the term of this patent is extended or adjusted under 35 U.S.C. 154(b) by 146 days.

(21) Appl. No.: 10/238,115

(22) Filed: Sep. 10, 2002

(65) Prior Publication Data

US 2003/0118844 A1   Jun. 26, 2003

Related U.S. Application Data

(60) Provisional application No. 60/325,326, filed on Sep. 25, 2001.

(51) Int. Cl.
| | |
|---|---|
| *B32B 15/08* | (2006.01) |
| *B32B 15/09* | (2006.01) |
| *B32B 15/18* | (2006.01) |
| *B32B 17/10* | (2006.01) |
| *B32B 37/16* | (2006.01) |

(52) U.S. Cl. ..................... 428/38; 428/201; 428/203; 428/210; 428/426; 428/430; 428/432; 428/457; 428/458; 428/480; 428/911; 428/920; 442/6; 442/8; 442/50; 442/52; 442/134; 442/136

(58) Field of Classification Search .............. 428/34, 428/426, 428, 430, 432, 480, 457
See application file for complete search history.

(56) References Cited

U.S. PATENT DOCUMENTS

| | | | | |
|---|---|---|---|---|
| 3,974,316 A | * | 8/1976 | Jacquemin et al. | ......... 428/215 |
| 4,027,443 A | * | 6/1977 | Briggs | ........................ 52/202 |
| 4,303,739 A | * | 12/1981 | Beckmann et al. | ......... 482/429 |
| 4,332,111 A | * | 6/1982 | Terashima | ........................ 52/1 |
| 4,913,847 A | * | 4/1990 | Tunker | ........................ 252/606 |
| 4,973,511 A | * | 11/1990 | Farmer et al. | .............. 428/216 |
| 4,978,405 A | * | 12/1990 | Hickman | ........................ 156/107 |
| 5,160,782 A | * | 11/1992 | Hickman | ........................ 442/18 |
| 5,219,630 A | * | 6/1993 | Hickman | ........................ 428/38 |
| 5,223,313 A | * | 6/1993 | Holzer et al. | ................. 428/34 |
| 5,230,954 A | * | 7/1993 | Sakamoto et al. | ......... 428/332 |
| 5,462,805 A | * | 10/1995 | Sakamoto et al. | ......... 428/430 |
| 5,622,580 A | * | 4/1997 | Mannheim | .................. 156/106 |
| 5,624,761 A | * | 4/1997 | Sakamoto et al. | ......... 428/426 |
| 5,653,839 A | * | 8/1997 | Itoh et al. | .................... 156/109 |
| 5,698,277 A | * | 12/1997 | Schueller et al. | ............. 428/34 |

(Continued)

*Primary Examiner*—Vivian Chen
(74) *Attorney, Agent, or Firm*—Fliesler Meyer LLP

(57) ABSTRACT

Fire resistant safety glasses are provided that included wire glasses having another layer of fire resistant material. In certain embodiments, a piece of wire glass has a sheet of fire resistant film adhered thereto. Such glasses have improved impact resistance compared to conventional wire glasses. Fire resistant safety glasses are also provided that combine improved impact resistance and fire protection and in some embodiments, improved thermal insulation, improved reflectivity and shielding against ionizing radiation. Safety glasses of this invention can be made using non-tempered or tempered glass, fire resistant plastics, fire resistant fiberglass, ceramics and other fire resistant glazing materials, and can be made in multiple layers, having one or more pieces of wire glass or fire resistant glazing materials. Fire resistant safety glasses of this invention can be made inexpensively and can have improved properties compared to conventional wire glass. By providing increased mechanical strength, the glasses of this invention can remain intact even if broken, thereby decreasing the risk of personal or property damage caused by glass shards.

6 Claims, 6 Drawing Sheets

U.S. PATENT DOCUMENTS

| | | | |
|---|---|---|---|
| 5,885,713 A | * 3/1999 | von Bonin et al. | 428/427 |
| 5,908,704 A | * 6/1999 | Friedman et al. | 428/426 |
| 6,159,606 A | * 12/2000 | Gelderie et al. | 428/426 |
| 6,606,831 B1 | * 8/2003 | Degelsegger | 52/204.1 |
| 6,613,411 B1 | * 9/2003 | Kollaja et al. | 428/40.1 |
| 6,716,497 B1 | * 4/2004 | Araki et al. | 428/34.7 |

* cited by examiner

FIRE RESISTANT SAFETY GLASS

RELATED APPLICATION

This application claims priority under 35 U.S.C. §119 to U.S. Provisional Patent Application Ser. No. 60/325,326, filed Sep. 25, 2001, incorporated herein fully by reference.

BACKGROUND

1. Field of the Invention

This invention relates to fire resistant safety glass and methods for production. Specifically, this invention relates to improved glass for the construction industry that provides increased safety and reduction of injuries upon breakage comprising wire glass and either a fire resistant film or another piece of fire resistant glazing material.

2. Description of Related Art

Wire glass continues to be widely used in the construction industry to provide transparent windows, doors, walls and the like. Wire glass generally consists of glass having a mesh of steel or other wire embedded within the glass. The use of wire glass has been motivated by a desire to provide transparent structures that are more resistant to fire than glasses having no wire. The wire in the glass holds the glass together in fire situations. Wire glass is commonly used in schools, public buildings, and other structures that are subject to fire. Typically, as used in schools, wire glass is used in hallways, gymnasium doors and walls. One drawback of wire glass is that if a person impacts the wire glass structure, the glass may break, the wire will keep the pane relatively intact, and this increases the danger of a person becoming injured.

Unfortunately, when broken, conventional wire glass is dangerous. For example, upon impact, the glass in a pane of wire glass can become broken into sharp pieces (shards) and the wire can actually hold the shards together to form a highly dangerous "spider-web" structure. In situations in which a person's extremity (arm or leg) actually penetrates through a broken portion of a pane of conventional wire glass, the damage can become so severe as to require major surgical procedures to repair the damage. In some cases, the limb must be amputated, and in other, more serious situations, death due to exanguination may occur.

FIG. 1a depicts a drawing of a pane of prior art wire glass 100 in top view. Glass 104 has wire mesh 108 embedded therein. FIG. 1b depicts a drawing of a pane of prior art wire glass 100 shown in cross-section. Glass 104 has wire mesh 108 embedded therein. In FIG. 1, the wire is depicted as in the mid portion of the pane of glass 104.

One reason for the dangers posed by conventional wire glass is that conventional wire glass does not meet current minimum safety glazing standards, which require impact resistance to an impact of about 100 foot pounds as measured using methods described in CPSC standard 16 C.F.R. 1201. Greater stresses can cause substantial breakage of conventional wire glass, and can result in the production of dangerous shards.

Prior art solutions to the problem include the use of tempered glass in the transparent structure. Unfortunately, tempered glass is poorly suited because it generally does not withstand the "hose stream" portion of fire testing as required by building codes. Steel bars, gratings or external mesh have also be added to provide increased impact resistance. However, gratings and the like can significantly increase the cost of production, the bulk of the structure, and can decrease visibility through the glass.

SUMMARY OF THE INVENTION

Thus, one object of this invention is the production of fire resistant safety glass that diminishes the danger posed by conventional wire glass.

Another object of this invention is the production of fire resistant safety glass that is less prone to breaking than conventional fire rated glass.

In one aspect of this invention, fire resistant safety glasses are provided that comprise a layer or pane of wire glass that has one or more surfaces having a coating of a fire-resistant film. The presence of a film can provide increased resistance to the formation of dangerous shards of broken glass in the pane. Addition of a fire resistant film to wire glass can increase the safety rating of the pane, thereby permitting its relatively safer use in situations in which persons or property can be damaged.

In other aspects of this invention, multilayered panes are provided having improved impact resistance and fire safety. In some embodiments, a pane of wire glass is reinforced by a pane of fire-resistant glass adhered to the pane of wire glass. In other embodiments, a pane of wire glass and apiece of fire-resistant glass have an insulating space therebetween. Further embodiments have wire glass and laminates and layers of fire resistant films and/or adhesives. In still further embodiments, fire resistant films can comprise metals, such as stainless steel or radiation shielding materials, such as lead. Metal-containing films can provide greater impact resistance, radiation shielding and/or reflectivity. Increasing reflectivity can reduce transmission of radiant heat. In some embodiments, structural integrity of glass can be improved, providing resistance to large forces, such as by way of example, caused by bullets or explosions.

BRIEF DESCRIPTION OF THE FIGURES

This invention is described with respect to specific embodiments thereof. Other features of this invention are described in the Figures, in which:

FIG. 1a is a top view of conventional wire glass. FIG. 1b is a side view of conventional wire glass.

DETAILED DESCRIPTION OF THE INVENTION

Safety fire rated glass of this invention can be made, according to some embodiments, by applying a layer of fire resistant film to an existing pane of wire glass. In these embodiments, immediate improvement in the performance characteristics of the wire glass can be obtained.

To increase the impact resistance further, both sides of a pane of conventional untempered wire glass can be covered with a fire resistant film. Such embodiments can exhibit improved impact resistance compared to glasses having only one surface covered with film. For example, the impact resistance can be increased from the conventional range of about 60–100 foot lbs to over about 100 foot lbs, and in other embodiments, to over about 150 foot lbs, and in yet other embodiments, over about 450 foot lbs, and in still further embodiments, about 4000 foot lbs. However, any desired degree of impact resistance can be obtained by providing additional layers of wire glass, fire resistant films and other fire resistant glazing materials.

Figure 1A:
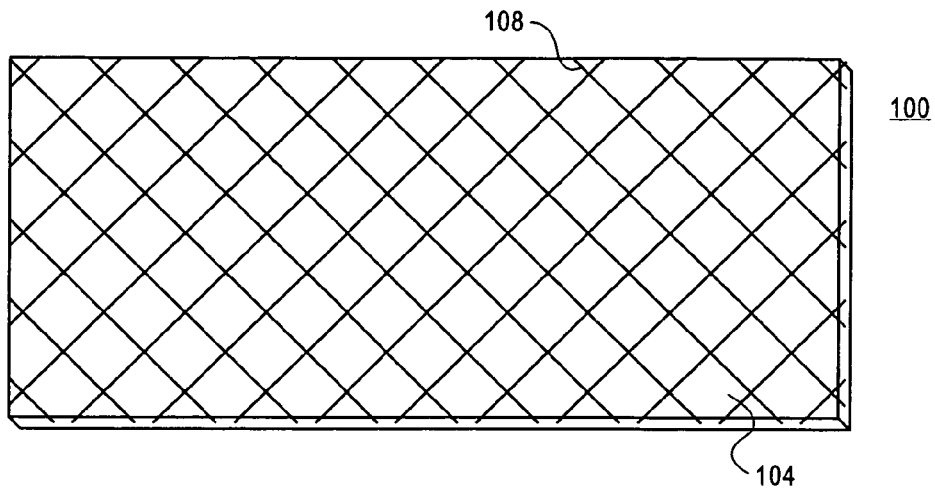
FIGS. 1a and 1b depict conventional wire glass.
Figure 1B:
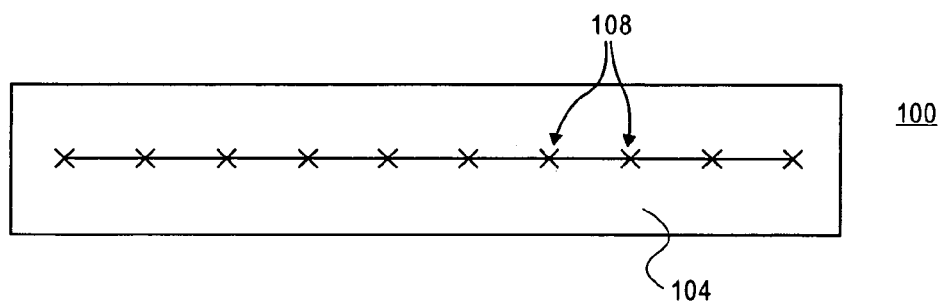
Figure 2:
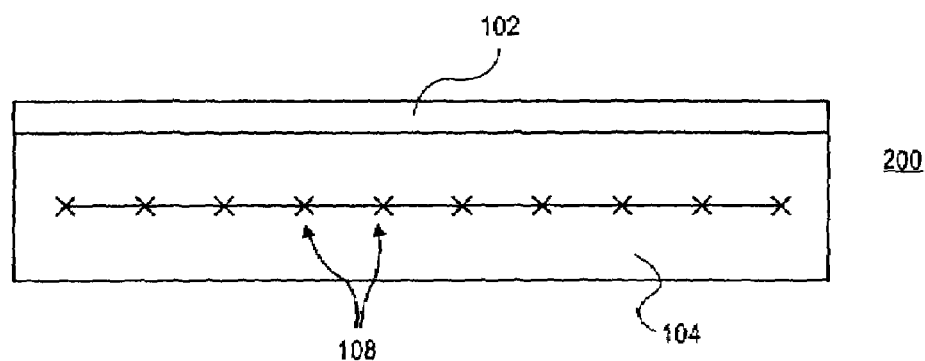
FIG. 2 is a drawing depicting an embodiment of this invention in which a pane of wire glass has a layer of fire resistant film applied to one surface.

FIG. 2 depicts an embodiment of this invention 200 of this invention in which a conventional pane of wire glass has a layer of fire resistant film adhered to one surface thereof. Glass 104 has wire mesh 108 embedded therein. Fire resistant film layer 112 is shown adhered to one surface of the pane.

Figure 3:
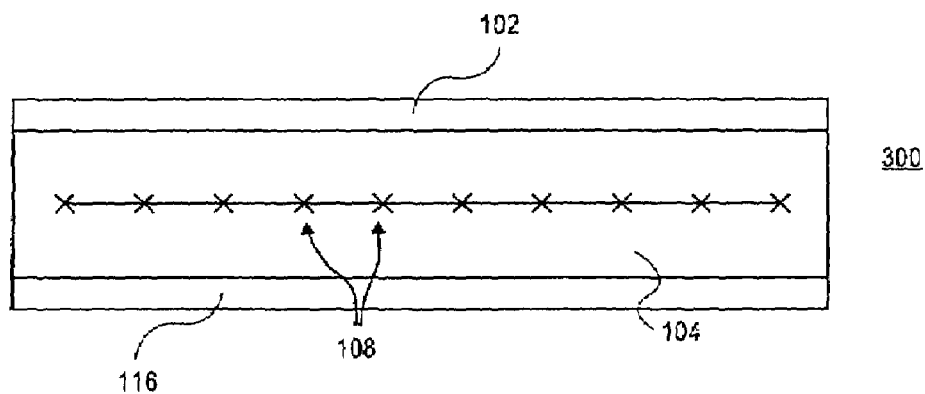
FIG. 3 is a drawing depicting an embodiment of this invention in which a pane of wire glass has layers of fire resistant film applied to top and bottom surfaces.

FIG. 3 depicts an embodiment of this invention 300 in which two sides of a conventional pane of wire glass have fire resistant film adhered thereto. Glass 104 has wire mesh 108 embedded therein. Fire resistant film layers 112 and 116 are shown adhered to each exterior surface of the pane.

One or more fire resistant films suitable for the safety wire glass of this invention are known in the art. In particular, it can be desirable to use a film having fire resistance, such as fluorinated polymers. In certain embodiments, PET can be used. The films confer mechanical integrity to the wire glass, thereby decreasing the tendency of the wire glass to form dangerous shards. Increasing the integrity of a wire glass after impact can improve the safety of the glass, even in situations in which fire is not a prominent hazard. It can be desirable to increase the impact resistance above conventional wire glass (70–100 ft lbs). In particular, for certain uses, it can be desirable to provide fire resistant safety glass having impact resistance of greater than about 100 ft lbs. In other embodiments, the impact resistance can be above about 150 ft lbs, and in still other embodiments, about 400 ft lbs or even 4000 ft lbs or higher.

Improving the impact resistance can be accomplished by providing laminates having at least one layer of wire glass and at least one other layer of material, including by way of example only, wire glass, annealed glass, tempered glass, fire resistant fiberglass, ceramics, fire resistant plastics and the like or other fire resistant glazing materials, or including multiple layers of fire resistant film. Laminates can be made by adhering two or more panes of material together with a fire resistant adhesive, such as water glass, or by using a fire resistant film. In some embodiments, the impact resistance can be sufficient to provide resistance to bullets and/or explosions.

Insulating fire resistant safety glasses can be made using one or more panes of wire glass, a fire resistant film adhered to, and another pane of transparent material placed near the pane of wire glass with an insulating space therebetween. The insulating space can be filled with air or other non-flammable gas, or can be filled with a fire resistant gel known in the art. Thus, in addition to fire resistance, some embodiments of this invention can provide thermal insulation greater that available with laminates or single-pane fire resistant safety glasses.

Fire resistant safety wire glasses of this invention include those having at least one layer of a metal-containing film. Metals can increase the reflectivity of a film to radiation, thereby decreasing the transmission of radiation, including thermal radiation, through the glass. By decreasing radiation transmission persons and/or structures can be at least partially protected from damage caused by radiation, including thermal damage. Metal containing films are known in the art. Metal-containing films include, by way of example only, Armor Coat™, Stainless Steel 160™, Stainless Steel 140™, Solar Bronze 150™, Solar Bronze 165™, Solar Bronze 175™ and Silver 80™. The above films can be obtained from M.S.C. Specialty Films, Inc. San Diego, Calif., a subsidiary of Bekaert Specialty Films LLC, Clearwater, Fla. However, other types of metal-containing films can be desirably used to decrease radiation transmission. An example of a non-metal film having some reflectivity is PET.

It can be desirable to provide a film having a degree of reflectivity of greater than about 5% to about 100%, alternatively in the range of about 10% to about 80%, in further embodiments in the range of about 25% to about 75%, and in still further embodiments in the range of about 40% to about 60%.

In the nuclear power industry and other industries where ionizing radiation is used, it can be desirable to provide fire resistant safety glass that are both fire-resistant and resistant to ionizing radiation. Thus, other embodiments of metal-containing films comprise a shielding metal such as lead and/or other materials known in the art. By way of example only, lead (Pb) particles or salts thereof can be added to a film in sizes from atomic size to about 10 micrometers ($\mu$m) to about 100 $\mu$m. In certain of these embodiments used for windows, it can be desirable to use particles having sizes sufficiently small to maintain optical transparency of the film. However, complete optical transparency may not be necessary in all embodiments, and some embodiments can incorporate relatively larger amounts of radiaiton shield material and save somewhat reduced transparency, but without adversely affecting the desirable properties of the window.

It can be appreciated that in certain circumstances, in which mechanical strength and integrity is important, that the increased safety can be desirable in spite of the increased cost of incorporating tempered glass or annealed glass.

Additional embodiments of this invention comprise laminates. Laminates are known in the art and comprise thin layers of a polymer or film material between plates of glass.

In certain embodiments, laminates comprise wire glass and two or more of annealed glass, tempered glass, fire resistant fiberglass, fire resistant plastics or fire resistant polymer films.

Figure 4:
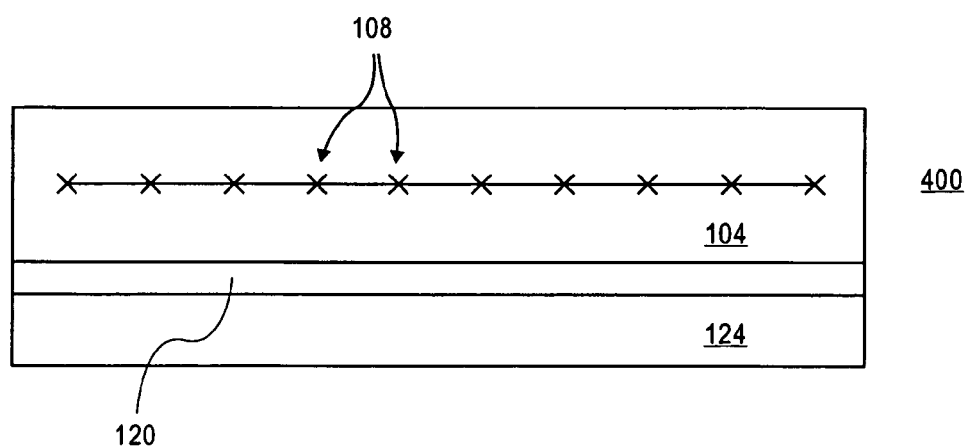
FIG. 4 is a drawing depicting a pane having a portion of wire glass laminated to a piece of non-wire glass or safety glass.

FIG. 4 depicts an embodiment 400 of this invention in which a pane of wire glass is laminated to another pane of non-wire glass. Glass 104 has wire 108 embedded therein. Laminate 120 comprising a fire resistant film adhered to one surface of glass 104. A second piece of glass 124 is depicted adhered to the laminate material 120.

Figure 5:
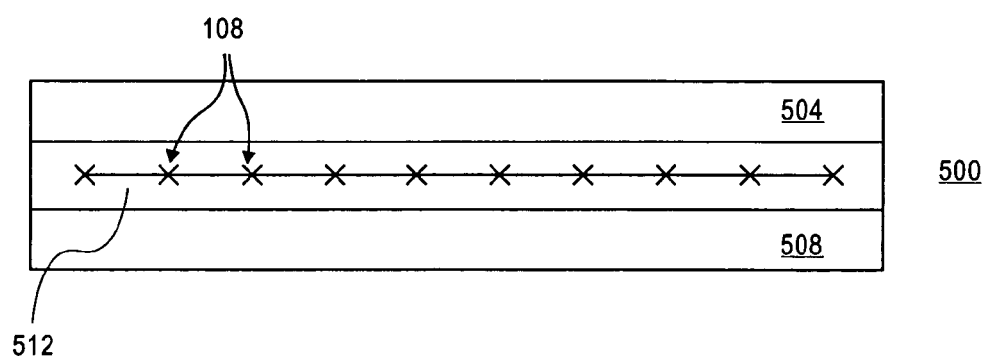
FIG. 5 depicts a drawing of an embodiment of safety wire glass of this invention in which wire is placed between two pieces of glass.

FIG. 5 depicts an alternative embodiment 500 of this invention in which two pieces of glass 504 and 508 have a space therebetween with fire resistant film 512 and wire 108.

Figure 6:
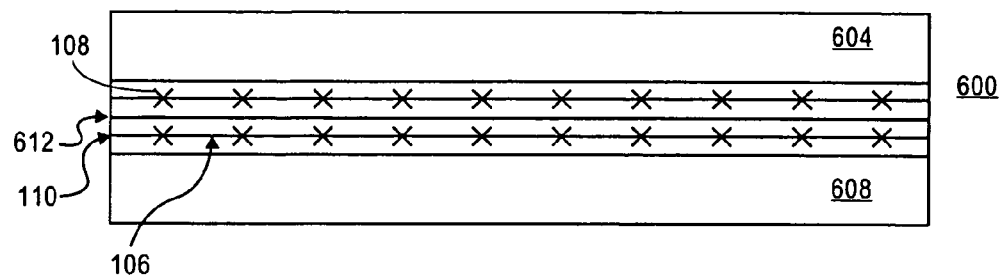
FIG. 6 is a drawing depicting an embodiment of this invention having two layers of glass having layers of wire glass and film therebetween.

FIG. 6 depicts an alternative embodiment 600 of this invention in which two panes of wire glass are sandwiched between two plates of non-wire glass. Panes 604 and 608 are laminated to panes 104 and 106, respectively. Panes 104 and 106 each have wire 108 and 110, embedded therein, respectively. In this figure, panes 108 and 110 are depicted adhered to each other by a fire resistant film 612, forming a laminate.

Figure 7:
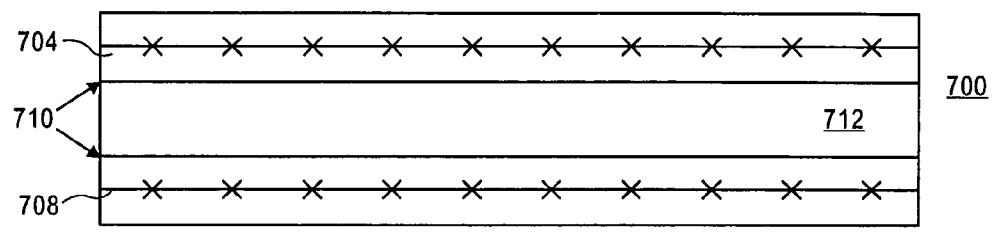
FIG. 7 depicts an embodiment of this invention having two layers of glass laminated to a piece of wire glass.

FIG. 7 depicts an alternative embodiment 700 of this invention in which two panes of wire glass 704 and 708 are attached to a piece of non-wire glass 712 by fire resistant film layers 710, thereby forming a laminate.

Figure 8:
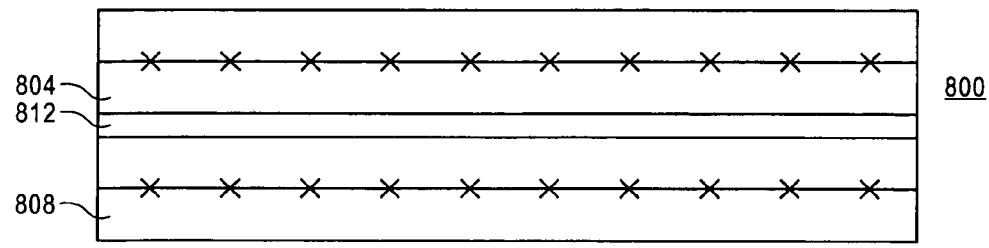
FIG. 8 depicts an embodiment of this invention having two pieces of wire glass in a laminate having a piece of safety glass therebetween.

FIG. 8 depicts an alternative embodiment 800 of this invention in which two panes of wire glass 804 and 808 having a layer of fire resistant film 812 therebetween forming a laminate.

Figure 9:
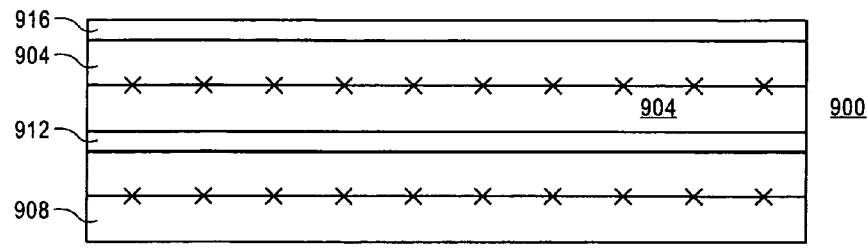
FIG. 9 depicts an embodiment of this invention having two pieces of wire glass in a laminate with two layers of film.

FIG. 9 depicts an alternative embodiment 900 of this invention having two layers of wire glass 904 and 908 having two layers of fire resistant film 912 and 916 adhered thereto, forming a laminate.

Figure 10:
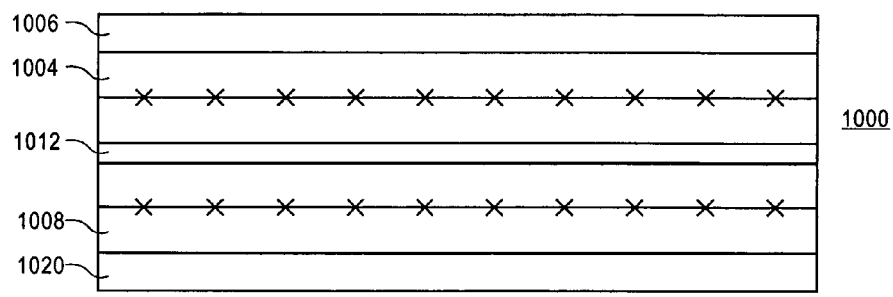
FIG. 10 depicts an alternative embodiment of this invention having two pieces of wire glass and two pieces of safety glass in a laminate structure.

FIG. 10 depicts an alternative embodiment 1000 of this invention having two panes of wire glass 1004 and 1008 having a layer of fire resistant film 1012, two panes of non-wire glass 1016 and 1020 forming a laminate.

Figure 11:
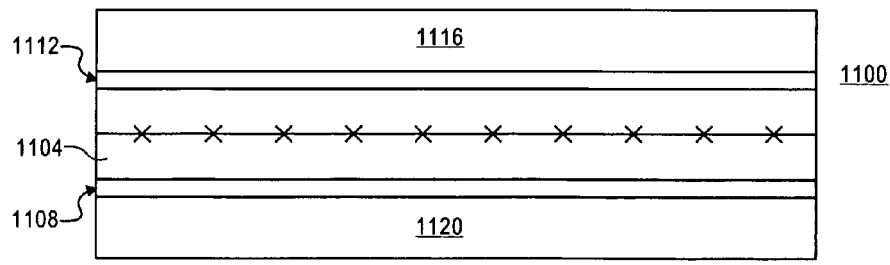
FIG. 11 depicts an embodiment of this invention having two pieces of fire resistant glazing material and one pane of wire glass.

FIG. 11 depicts an alternative embodiment 1100 of this invention having a pane of wire glass 1104 having layers of fire resistant film 1108 and 1112 attached thereto, and two panes of non-wire glass 1116 and 1120 attached to the fire resistant film forming a laminate.

Figure 12:
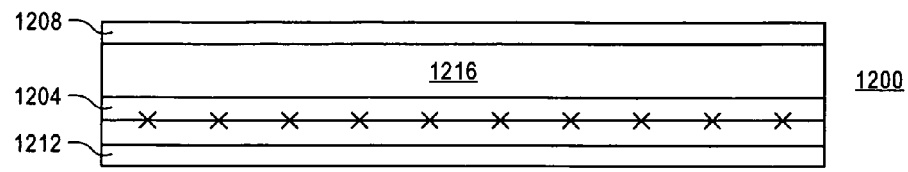
FIG. 12 depicts an alternative embodiment of this invention having a pane of fire resistant glazing material and one pane of wire glass and having an insulation space therebetween.

FIG. 12 depicts an alternative embodiment 1200 of this invention having a pane of wire glass 1204 having a layer of fire resistant film 1212 adhered thereto. Fire resistant glazing material 1208 is separated from wire glass 1204 by insulating space 1216. Insulating space 1216 maybe filled with a non-flammable insulating gas or a fire resistant insulating gel.

Figure 13A:
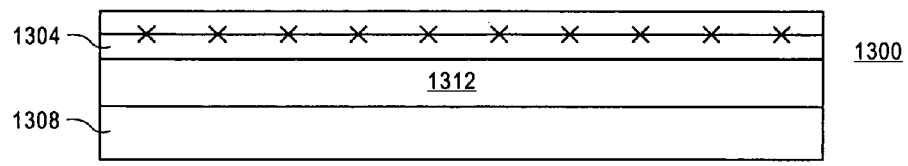
FIGS. 13a and 13b depict an alternative embodiment of this invention having a pane of wire glass and another pane of fire-resistant glazing.
Figure 13B:
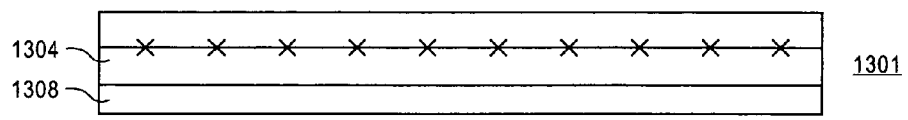

FIG. 13a depicts an embodiment 1300 of this invention having a pane of wire glass 1304 a pane of fire resistant transparent material 1308 and an insulating space 1312 therebetween. In certain embodiments 1301 depicted in FIG. 13b, panes 1304 and 1308 can be directly in contact with each other without an insulating space.

Figure 14:
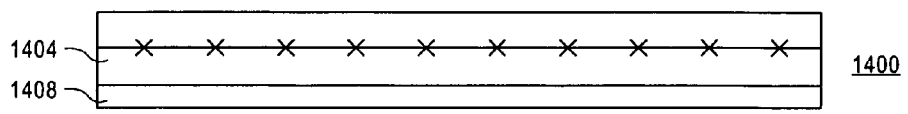
FIG. 14 depicts an alternative embodiment of this invention having a pane of wire glass and a fire resistant film comprising a metal.

FIG. 14 depicts an alternative embodiment 1400 of this invention having a pane of wire glass 1404 and a layer of metal-containing film 1408.

In related embodiments, the orientation of the components can be varied, for example, with the panes containing wire on the outside of the overall structure, or alternatively, with one side of the overall structure having wire glass on the outside and another side of the overall structure having non-wire glass on the outside. It can be appreciated that many different orientations of the components of wire glass, non-wire glass, polymer, and other laminate structures are possible. All of those embodiments are within the spirit and scope of this invention.

Fire resistant safety glass can either be made in a desired configuration or shape, such as circular, rectangular, triangular, or other desired shape. Alternatively, the safety fire rated wire glass can be subsequently processed into desired shapes using methods known in the art. Once manufactured, the glass can be inserted into, for example, a window, a door, or can be enclosed in a frame. Applications include those for schools, hospitals, factories, property lines and any place requiring a fire rating and safety of persons or property. Fire resistant safety glass can be used for any construction purpose where vision, radiant heat protection, safety and a fire rating is required. The materials of this invention therefore can have desirable performance characteristics in forms having larger surface areas ("lite sizes") and smaller thicknesses than available in the prior art.

Similarly, land or airborne vehicles can incorporate fire resistant safety glass of this invention. Such vehicles include cars, busses, trains, airplanes, rockets and the like. In these vehicles, the light weight of the fire-resistant safety wire glass can provide improved fire resistance without compromising the function of the vehicle.

In the example below, specific materials and methods are described. However, the example below are not intended to limit the scope of the invention. Rather, other possible materials and methods can be advantageously used to produce materials within the scope of this invention. Many other applications are possible, and all such uses are contemplated and are considered within the scope of this invention.

EXAMPLE 1

Fire Test of Fire-Resistant Safety Glass

In a study of the fire resistance of a pane of fire resistant safety glass of this invention, a ¼ inch thick wired glass with safety film applied to both surfaces was installed in a test frame. The test sample was installed in a gypsum board frame and held in place using brackets. The test was conducted according to standard methods in the art. The test sample was subjected to the time-temperature curve specified in UBC Standard 7-4 (1997) Standard for Fire Tests of Window Assemblies. The effects of temperature on the sample are presented in Table 1.

TABLE 1

Effects of Temperature on Exposed Surface of Safety Fire Rated Wire Glass

| Test Time (min) | Effect on Exposed Surface |
| --- | --- |
| 3 | Wallboard ignited |
| 6 | Glass flaming |
| 10 | No change |
| 15 | Flaming on perimeter of glass |
| 30 | Film burned off; glass is clear |
| 45 | Test stopped |

Additional observations of the unexposed surface are shown in Table 2.

TABLE 2

Effects of Temperature on Unexposed Surface of Safety Fire Rated Wire Glass

| Test Time (min) | Effect on Unexposed Surface |
| --- | --- |
| 5 | Glass is cracked. Caulking is expanding out at header and other areas |
| 6 | Film on glass is smoking and becoming dark |
| 10 | No change |
| 15 | Film flaking off; glazing become clear |
| 30–45 | No change |

The results shown in Tables 1 and 2 demonstrate that the test assembly passed the Fire Endurance Test. Additionally, a Hose Stream test was performed on samples of safety fire rated wire glass according to standard methods in the art. The sample passed the test without breakage.

INDUSTRIAL APPLICABILITY

Fire resistant safety glasses of this invention have applications in any area in which a transparent material that is resistant to fire and to impact is desirable. Fire resistant safety glasses can be resistant to breakage into dangerous glass shards that can cause injury to property or persons. Moreover, if fire resistant safety glass does break, safety glasses will be more resistant to the formation of exposed shards that can cause significant injury to persons and/or property. Fire resistant safety glasses can be used for any construction purpose where transparency, radiant heat protection, safety and a fire rating is required. Applications include those for schools, hospitals, factories, property lines, hulls and/or any place requiring a fire resistance for safety of persons or property. The methods of this invention permit that rapid, accurate manufacture of fire-resistant transparent materials with increased efficiency and reduced cost.

I claim:

1. A fire resistant safety glass, consisting essentially of:
    a piece of wire glass; and
    a fire resistant film adhered to said piece of wire glass sufficient to impart an impact resistance of at least about 100 foot lbs. and further wherein the fire resistant film contains PET.

2. The fire resistant safety glass of claim 1, further comprising a coloring agent.

3. The fire resistant safety wire glass of claim 1, wherein said fire resistant film is a reflective film.

4. The fire resistant safety wire glass of claim 1, wherein said fire resistant film comprises a metal.

5. The fire resistant safety wire glass of claim 4, wherein said metal comprises stainless steel or read.

6. A method of manufacturing a fire resistant safety glass, consisting essentially of the steps of:
    providing one sheet of wire glass; and
adhering a fire resistant film of PET to said sheet of wire glass sufficient to impart to said fire resistant safety glass an impact resistance of about 100 foot lbs to about 4000 foot lbs.

\* \* \* \* \*

(12) INTER PARTES REEXAMINATION CERTIFICATE (0395th)
United States Patent
O'Keeffe

(10) Number: US 7,090,906 C1
(45) Certificate Issued: Jun. 26, 2012

(54) FIRE RESISTANT SAFETY GLASS

(76) Inventor: William O'Keeffe, San Francisco, CA (US)

Reexamination Request:
No. 95/001,010, Oct. 23, 2007
No. 95/001,020, Jan. 7, 2008
No. 90/010,016, Aug. 29, 2007

Reexamination Certificate for:
Patent No.: 7,090,906
Issued: Aug. 15, 2006
Appl. No.: 10/238,115
Filed: Sep. 10, 2002

Related U.S. Application Data

(60) Provisional application No. 60/325,326, filed on Sep. 25, 2001.

(51) Int. Cl.
*B32B 15/08* (2006.01)
*B32B 15/09* (2006.01)
*B32B 15/18* (2006.01)
*B32B 17/10* (2006.01)
*B32B 37/16* (2006.01)

(52) U.S. Cl. .......... 428/38; 428/201; 428/203; 428/210; 428/426; 428/430; 428/432; 428/457; 428/458; 428/480; 428/911; 428/920; 442/6; 442/8; 442/50; 442/52; 442/134; 442/156

(58) Field of Classification Search .............. None
See application file for complete search history.

(56) References Cited

To view the complete listing of prior art documents cited during the proceedings for Reexamination Control Numbers 90/010,016, 95/001,010 and 95/001,020 please refer to the USPTO's public Patent Application Information Retrieval (PAIR) system under the Display References tab.

*Primary Examiner* — Elizabeth McKane

(57) ABSTRACT

Fire resistant safety glasses are provided that included wire glasses having another layer of fire resistant material. In certain embodiments, a piece of wire glass has a sheet of fire resistant film adhered thereto. Such glasses have improved impact resistance compared to conventional wire glasses. Fire resistant safety glasses are also provided that combine improved impact resistance and fire protection and in some embodiments, improved thermal insulation, improved reflectivity and shielding against ionizing radiation. Safety glasses of this invention can be made using non-tempered or tempered glass, fire resistant plastics, fire resistant fiberglass, ceramics and other fire resistant glazing materials, and can be made in multiple layers, having one or more pieces of wire glass or fire resistant glazing materials. Fire resistant safety glasses of this invention can be made inexpensively and can have improved properties compared to conventional wire glass. By providing increased mechanical strength, the glasses of this invention can remain intact even if broken, thereby decreasing the risk of personal or property damage caused by glass shards.

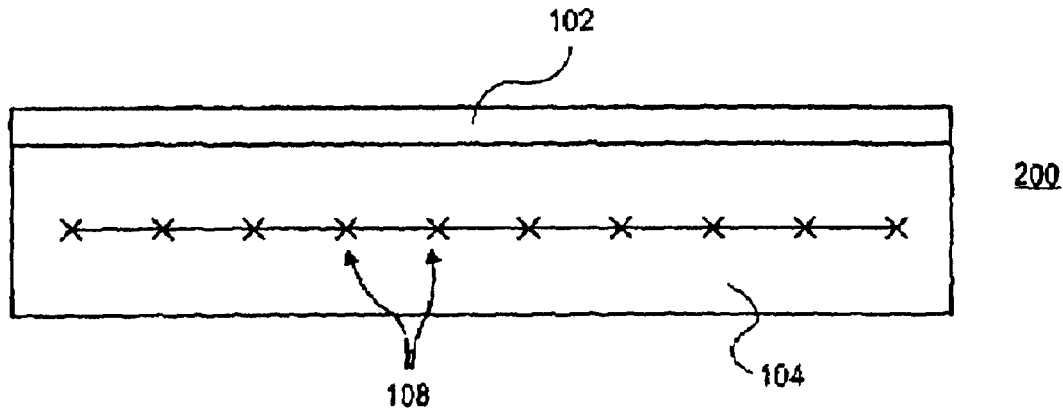

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *